United States Patent [19]

Ijiri et al.

[11] Patent Number: 5,133,423
[45] Date of Patent: * Jul. 28, 1992

[54] POWER STEERING APPARATUS

[75] Inventors: Waichiro Ijiri; Masayuki Watanabe; Yoshihiro Ohashi, all of Osaka, Japan

[73] Assignee: Koyo Seiko Co., Ltd., Osaka, Japan

[*] Notice: The portion of the term of this patent subsequent to Aug. 4, 2004 has been disclaimed.

[21] Appl. No.: 601,656

[22] Filed: Jul. 21, 1989

Related U.S. Application Data

[63] Continuation-in-part of Ser. No. 224,539, Jul. 26, 1988, Pat. No. 4,865,145.

Foreign Application Priority Data

Jul. 31, 1987 [JP] Japan .............................. 62-193543
Jul. 31, 1987 [JP] Japan .............................. 62-193544

[51] Int. Cl.⁵ .................................................. B62B 5/04
[52] U.S. Cl. ................................................. 180/79.1
[58] Field of Search ................. 180/79.1, 148, 132, 180/79.3; 74/388 PS, 498

[56] References Cited

U.S. PATENT DOCUMENTS

| | | | |
|---|---|---|---|
| 4,593,780 | 6/1986 | Saito | 180/79.1 |
| 4,681,182 | 7/1987 | Suzuki et al. | 180/79.1 |
| 4,724,915 | 2/1988 | Morishita et al. | 180/79.1 |
| 4,735,271 | 4/1988 | Shimizu et al. | 180/79.1 |
| 4,742,882 | 5/1988 | Shimizu et al. | 180/79.1 |
| 4,865,145 | 9/1989 | Ijiri et al. | 180/79.1 |

FOREIGN PATENT DOCUMENTS 61-171663 8/1988 Japan .

Primary Examiner—Andres Kashnikow
Assistant Examiner—Richard Camby
Attorney, Agent, or Firm—Darby & Darby

[57] ABSTRACT

A power steering apparatus in which a motor for assisting steering force is mounted in such a manner that it is positioned substantially in parallel to a rack shaft of a rack-pinion type steering mechanism, and a planetary roller reduction device and a bevel gear connected directly thereto are mounted to the rotary shaft of the motor, coaxially with the motor, whereby the speed of the turning force of the motor may be reduced sufficiently and thus decelerated turning force is transmitted to the rack shaft, to permit compact disposing of the motor and the reduction device around the steering mechanism. In one embodiment of the invention the motor is mounted below the rack shaft and in another above the rack shaft between the steering wheel and the rack shaft.

8 Claims, 4 Drawing Sheets

POWER STEERING APPARATUS

RELATED APPLICATION

This application is a continuation in part of application Ser. No. 224,539 filed Jul. 26, 1988, which is assigned to the same Assignee, now U.S. Pat. No. 4,865,145 granted Sept. 12, 1989.

BACKGROUND OF THE INVENTION

This invention generally relates to an electric power steering apparatus in which the force required for operating the steering wheel is assisted with the turning force of an electric motor and, more in particular, to a power steering apparatus with a miniaturized electric motor and a reduction device.

DESCRIPTION OF THE PRIOR ART

There has been developed an electric power steering apparatus in which a motor for assisting the steering operation is driven on the basis of the detected results of the steering torque applied on the steering wheel and the force required for operating the steering wheel of a car is assisted with the turning force of the motor to make the driver feel comfortable in steering the car.

Conventional power steering apparatus comprises a rack shaft, extending from side to side of the car body, with each of both end portions thereof connected to each of the wheel on either side of the body by means of a separate tie rod, and a pinion engaging with said rack shaft in the middle part thereof and connected interlockingly to the steering wheel. In a car equipped with a rack-pinion type steering mechanism in which the rotation of the pinion caused by the rotational operation of the steering wheel is converted to the displacement of the rack shaft in the longitudinal direction thereof to carry out steering, the power steering mechanism is classified into two types according to the position where the motor for assisting steering is disposed. That is, one is such that the aforesaid pinion shaft is extended further from the place where this engages with the rack shaft and the aforesaid motor is disposed to transmit the turning force on the extended portion through a proper reduction device. The other is such that an auxiliary pinion is provided engaging with the rack shaft at a place in the longitudinal different from that of the place where the pinion engages with the rack shaft and said motor is disposed to transmit the turning force thereof to said auxiliary pinion through a proper reduction device. The former is called one-pinion type and the latter two-pinion type according to the number of pinions engaging with the rack shaft.

On the other hand, a torque sensor is generally used as means for detecting the steering torque as relative displacement between said two shafts caused by torsions of the torsion bar as mentioned above in which said pinion shaft is firstly divided into two in the middle part thereof and these divided shafts are connected to each other on the same axis through a torsion bar, then a potentiometer is constructed around this connecting part.

In this way every type of the power steering apparatus as mentioned above has adopted a construction in which the turning force of the motor for assisting steering is transmitted to the pinion which engages with the rack shaft from the rectangularly or obliquely crossing direction. In such a construction said motor is provided around the rack shaft in the steering mechanism. This type of construction, however, has such a defect that the positioning for disposing the steering mechanism is restricted, for the mechanism is provided at a lower part of the engine room with a small excess space. Besides, as mentioned above, it is necessary to provide a reduction device having a great reduction ratio between the motor and the pinion in order to reduce the rotational speed of the motor to a travelling speed of the rack shaft suitable for steering and in order to let the rack shaft have sufficient assisting power. This reduction device is massive, so that it is difficult to dispose the motor as mentioned above in the mechanism. Consequently, when the manufacturer desires to mount such a power steering device in the car, sometimes it has been necessary to draw newly a design of the engine room so as to secure the space for disposing the motor and reduction device.

Besides, in a power steering apparatus of such a construction, while the positioning for disposing the pinion shaft in the direction from side to side of the car body is limited by the relation with the rack shaft disposed at the central part of the car body on the one hand, the positioning for disposing the steering wheel which is interlockingly connected to the pinion shaft is limited by the relation with the driver's seat in the compartment on the other hand, so that the pinion shaft and the rack shaft are forced to be disposed assymetrically and the pinion shaft and the rack shaft are engaged with each other obliquely to intersect their axis for the purpose of connecting them to each other without strain. Consequently, a considerable amount of load is applied on the pinion shaft at a place where it engages with said rack shaft. On the other hand, in a torque sensor in which a potentiometer is constructed on the pinion shaft, as mentioned above, picking-out of the output signal of the sensor and the impression of prescribed electric potential on the sensor are carried out through a slip ring because of the torque sensor rotating together with the pinion shaft, so that when the pinion shaft has carried out displacement in the longitudinal direction thereof due to the load caused in the way as mentioned above, the torque sensor will often misoperates as a result of the change of the position where the slip ring and the detecting wire slidingly contacts to each other even if said amount of displacement is slight one, and the motor for assisting steering is driven in accordance to the erroneously-detected result, which causes discrepancies between the amount of steering operation and that of the actual steering and further causes such a trouble that the detecting wire is deviated from the position where the wire slidingly contacts to the slip ring, when the amount of displacement is great, which results in that detection of the steering torque comes to be impossible.

Therefore, in a conventional power steering apparatus, the pinion shaft is held by means of a pair of angular ball bearings disposed on both sides of the place where the pinion shaft engages with the rack shaft to let these bearings bear the load in the longitudinal direction. In addition, in assembling the pinion shaft housing to the rack shaft housing, the angular ball bearings is constructed to be affected by prescribed prepressurization through separate adjustment of the thickness and/or number of shims provided therebetween in order to make the displacement in the longitudinal direction as little as possible. This type of steering apparatus has such defects that it requires much time and labor in assembling and that alien substances in the rack shaft housing such as grease and the like sealed in the place where the pinion shaft and the rack shaft engages each other will intrude in the place where the torque sensor is provided and adhere to the sensor, which has often caused misoperations of the torque sensor and eventually discrepancies between the amount of steering operation and that of the actual steering.

Not only a one-pinion type power steering apparatus as mentioned above, but also a two-pinion type power steering apparatus wherein the turning force of the motor for assisting the steering is transmitted to auxiliary pinion shaft engaging with said rack shaft at a place in the longitudinal direction different from the pinion shaft has had such defects as mentioned above. Furthermore, such troubles have occurred in the power steering apparatus constructed in the steering mechanism of a type other than the rack-pinion type as mentioned above, such as ball-nut type steering mechanism and the like.

SUMMARY OF THE INVENTION

This invention has been initiated for solving problems in the prior art as described above and a first object thereof is to provide a power steering apparatus in which a steering-assisting motor and a reduction device are compactly installed around a steering mechanism to be placed easily in a small engine room.

A second object of this invention is to provide a power steering apparatus in which much time and labor are not required in assembling, the amount of displacement of the input shaft in the longitudinal direction thereof after being assembled is kept as little as possible, and intrusion of alien substances into the torque sensor portion is prevented substantially completely, so that there is no danger of the torque sensor misoperating to enable to prevent such troubles as mentioned above from occurring.

The above and further objects and features of the invention will more fully be apparent from the following detailed description with accompanying drawings.

DESCRIPTION OF THE PREFERRED EMBODIMENTS

Figure 1:
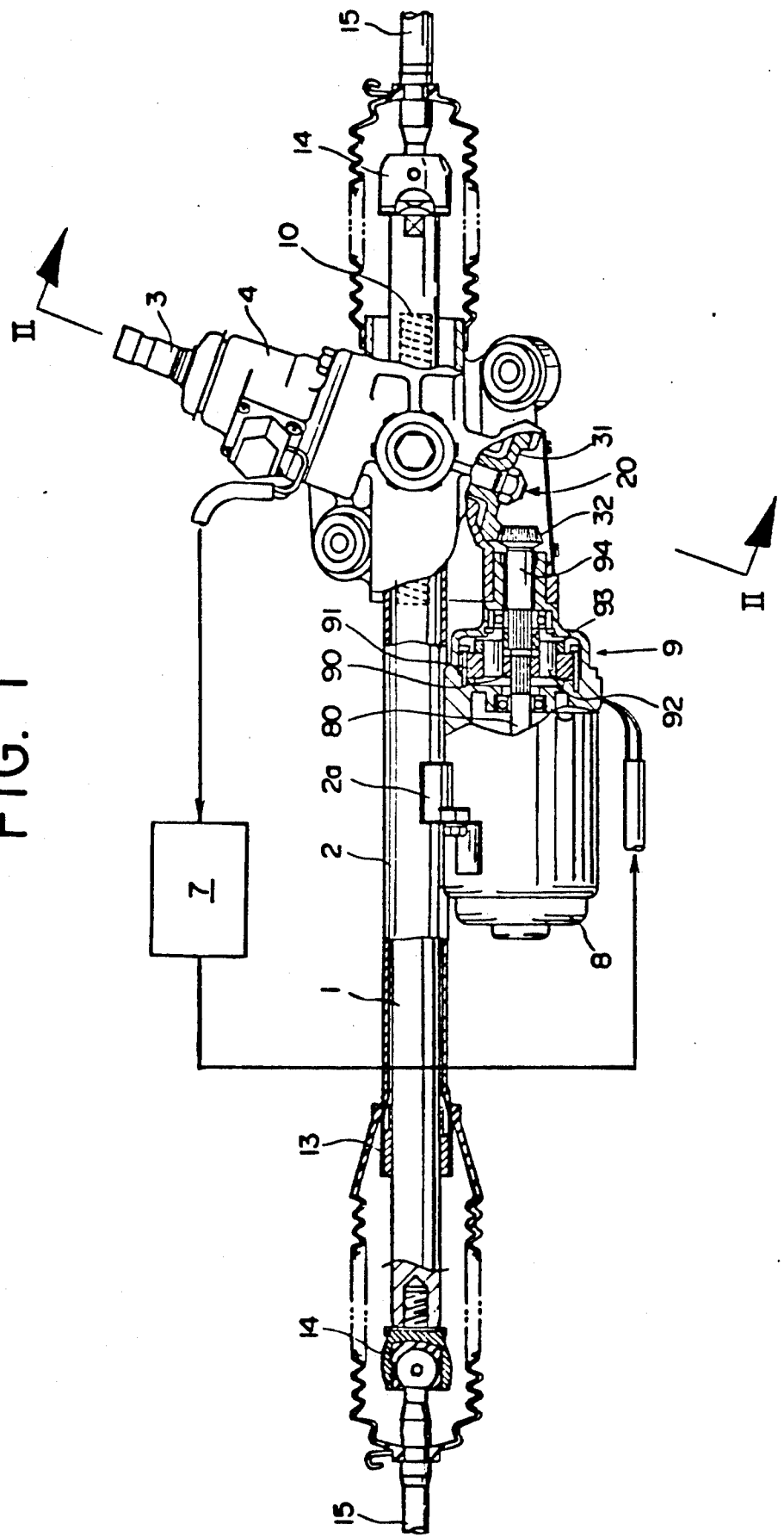
FIG. 1 is a partially broken front view of a power steering apparatus according to this invention.

This invention will be described with reference to the drawings showing the embodiments thereof. FIG. 1 is a partially broken front view of a power steering apparatus according to this invention, and FIG. 2 is an enlarged sectional view thereof taken along the line II—II of FIG. 1.

In the drawings, numeral 1 denotes a rack shaft extending long in the lateral direction of the car body and fixed to a part of the car body, and inserted into a rack shaft case 2 coaxially therewith. Numeral 3 denotes a pinion shaft which is axially supported in a pinion shaft housing 4 interlocking mounted therewith near one end portion of the rack shaft case 2 to obliquely intersect the rack shaft 2 at axial center thereof.

Figure 2:
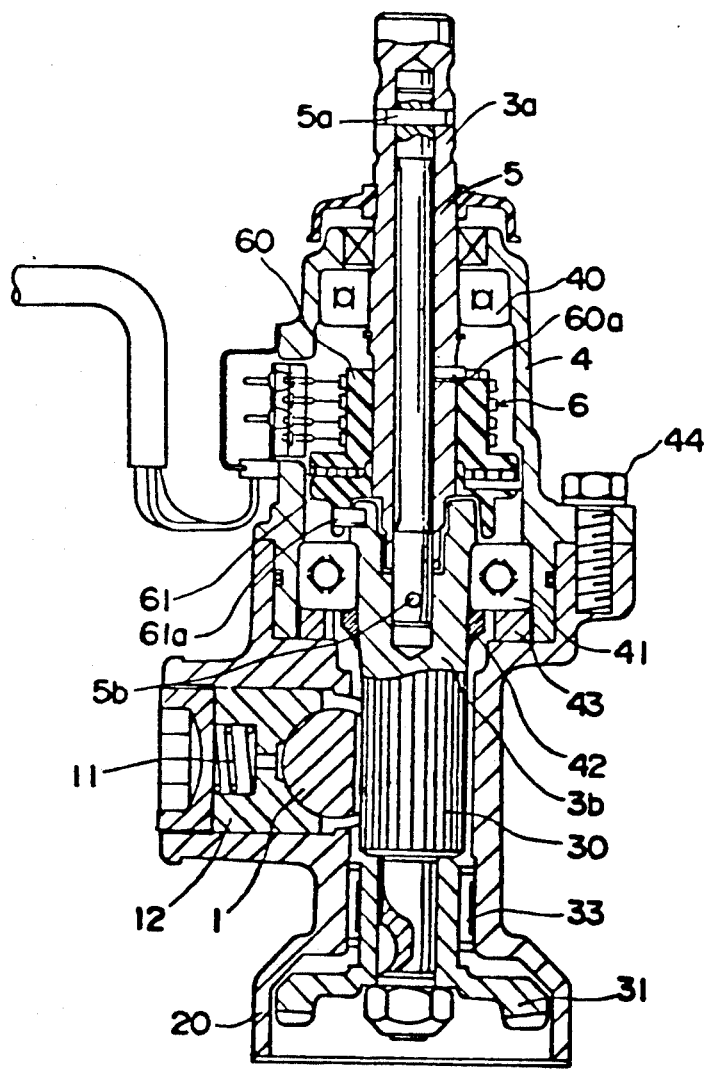
FIG. 2 is an enlarged sectional view thereof taken along the line II—II of FIG. 1, showing the state of the engagement of a pinion shaft with a rack shaft.

As shown in FIG. 2, the pinion shaft 3 comprises an uppper shaft 3a which is an input shaft and a lower shaft 3b which is an output shaft, both shafts being connected coaxially by means of a torsion bar 5. The uppper shaft 3a is supported in the pinion shaft housing 4 by means of ball bearings 40 and its upper end portion is interlockingly connected to a steering wheel by means of a universal joint not shown in the drawings. The lower shaft 3b is supported in the pinion shaft housing 4 by means of four-point contact ball bearings 41 with lower part thereof projected from the lower opening portion of the pinion shaft housing 4 by a suitable length. The four-point contact ball bearings 41 externally fit on the lower shaft 3b from lower end portion thereof and, after being positioned in the longitudinal direction at the outside of the lower shaft 3b with both sides of inside thereof clasped with a stepped portion which is formed near the upper end portion of the lower shaft 3b and a collar 42 which fits on the lower shaft from lower end portion thereof and staked and mounted on outer peripheral surface, are fitted in the pinion shaft housing 4 from the lower opening portion together with the lower shaft 3b. The four-point contact ball bearings 41 are further positined in the pinion shaft housing 4 in the longitudinal direction with both sides of outside thereof clasped with an annular shoulder portion formed at a lower part of said housing 4 and lock nuts 43 threadedly provided in said housing 4 from said opening portion, and it is constructed that said ball bearings hold the radial load and thrust load in both directions applied on the lower shaft 3b.

Pinion teeth 30 are formed by a suitable length in the longitudinal direction at the middle part of said lower shaft 3b projecting from the pinion housing 4. The pinion teeth 30 engage with rack teeth 10 formed by a suitable length in the longitudinal direction at a place a little close to one end portion said rack shaft 1, in the rack shaft case 2 when the pinion shaft housing 4 is firmly mounted on the rack shaft case 2 with a fixing bolt 44, and the lower shaft 3b intersects the rack shaft 1 obliquely at their respective axial center to engage with each other. The lower shaft 3b is further extended downward beyond the place of engagement with the rack shaft 1, and a big bevel gear 31 is fitted at lower end portion of the lower shaft 3b coaxially therewith its teeth side downward. The lower shaft 3b is held by means of needle-shaped roller bearings in a bevel gear housing 20 which is provided in such a manner that it surrounds the big bevel gear and mounted interlockingly below the rack shaft case 2. Consequently, the lower shaft 3b is held on both sides of the place where the rack teeth 10 and the pinion teeth 30 engage one another by means of the four-point contact ball bearings 41 and the needle-shaped roller bearings 33, so that the amount of bending with respect to the lower shaft 3b at the place of engagement is kept within a prescribed permissible level.

At the place where the rack teeth 10 and pinion teeth 30 engage one another, a pressing element 12 is provided for pressing the rack shaft 1 by the use of the encouraging force of a pressing spring 11 advancing toward the pinion shaft 3 so that the rack teeth 10 and the pinion teeth 30 may engage one another without any clearance. In such a construction the rack shaft 1 is held at the place of engagement in such a manner that it is clasped from both sides in the radial direction not only by means of the pressing element 12 and the lower shaft 3b, but also by means of a bearing bush 13 which is fitted into the rack shaft case 2 at an end portion thereof on the opposite side to the position where the rack shaft 1 is provided interlockingly with the pinion shaft housing 4, capable of moving in the longitudinal direction thereof in the rack shaft case 2. Both end portions of the rack shaft 1 in the lateral direction, projected on both sides of the rack shaft case 2 are respectively connected to separate tie rods 15 which are communicated with the wheels on either side not shown in the drawings by means of separate ball joints 14, so that the wheels can be steered on either side by the travel of the rack shaft 1 in the longitudinal direction.

Numeral 6 denotes a torque sensor for detecting the steering torque applied on the steering wheel. The torque sensor constructs a potentiometer of a resisting element holding member 60 which is externally fitted to said upper shaft 3a and rotates together with the upper shaft with an annular resisting element formed around the axis of the upper shaft 3a on the lower end surface thereof, and a detecting element holding member 61 which is externally fitted on said lower shaft 3b and rotates together with the lower shaft with a detecting element sliding to one point of the resisting element in the radial direction formed on the upper end surface thereof.

The upper shaft 3a of the pinion shaft 3 axially rotates correspondingly to the rotation of the steering wheel. The lower shaft 3b is affected by the surface resistance applied on the wheels through the rack shaft 1, while torsions are caused on a torsion bar 5 provided between both upper and lower shafts, correspondingly to the steering torque applied on the steering wheel. The torque sensor 6 outputs the relative displacement in the circumferential direction caused between the upper shaft 3a and the lower shaft 3b in accordance with the torsion of the torsion bar 6 as the electric potential corresponding to the sliding position between said detecting element and said resisting element. The torque sensor is initially adjusted to output a prescribed standard electric potential when no torsion is caused on the torsion bar 5, namely, when the steering operation is into carried out. The output signal of the torque sensor 6 is inputted in a control portion 7. The control portion 7 recognizes the direction and the magnitude of said steering torque by comparing the output signal with said standard electric potential to send a driving signal to a motor 8 for assisting steering provided as will be described later.

The motor 8 for assisting steering is provided for the purpose of transmitting the turning force thereof to said lower shaft 3b through a planetary roller reduction device 9 and a small bevel gear 32 which engages with said big bevel gear 31 with a diameter smaller than that of said big bevel gear. The planetary roller roduction device 9 comprises a sun roller 90 which is externally fitted on a rotary shaft 80 of the motor 8 coaxially therewith and rotates together with said rotary shaft 80, an external annular portion 91 which is annular-shaped and secured on the rotary shaft 80 coaxially therewith on the end surface of the casing of the motor 8 on the side where said rotary shaft 80 is projecting, plural number of planetary rollers 92 which contact respectively the inner peripheral surface of said external annular portion 91 and the outer peripheral surface of said sun roller 90 by their rotation and revolve on their own axes and around the sun roller 90, and a planetary carrier 93 which respectively holds these planetary rollers 92 axially, and has smaller outside diameter than that of said motor 8, and is incorporated into the motor 8 on the side of the rotary shaft 80. The output shaft 94 of the planetary roller reduction device 9 is fitted into the axis position of the planetary carrier 93 positioned coaxially with the rotary shaft 80 of the motor 8, secured and projected outward by a proper length. The small bevel gear 32 is fitted to the top end portion of the output shaft 94 with its teeth side positioned toward the top end portion, and constructed to rotate together with the output shaft 94 in accordance with the revolution of the planetary rollers 92.

The motor 8 and the planetary roller reduction device 9 are internally fitted to the bevel gear housing 20 in such a manner that these axes align substantially in parallel with the axis of the rack shaft 1 with the small bevel gear 32 inside, are engaged with the big bevel gear 31 to which the small bevel gear 32 is fitted to the lower end portion of the lower shaft 3b, and are secured to a bracket 2a provided outside of the rack shaft case 2. The backlash adjustment between the big bevel gear 31 and the small bevel gear 32 can be carried out easily by changing the thickness and number of thje shim provided at the confronting portion between the casing of the planetary roller reduction device 9 and the bevel gear housing 20 when the planetary roller reduction device 9 is internally fixed in the bevel gear housing 20.

The motor 8 for assisting steering constructed in this way is connected to the control portion 7 through a driving circuit not shown in the drawings, and rotates clockwise or counterclockwise according to the driving signal sent from the control portion 7 in accordance with the magnitude and the direction of the steering torque detected by the torque sensor 6. The rotation of the motor 8 is reduced to about one sixth by the planetary roller reduction device 9, and further to about one third by the big bevel gear 31 and the small bevel gear 32, then transmitted to said lower shaft 3b. The rotation of the shaft 3b is further transmitted to the rack shaft 1 through the engagement of the pinion teeth 30 with the rack teeth 10 to cause the travel of the rack shaft 1 in the longitudinal direction at a proper traveling speed corresponding to the rotational speed of the pinion shaft 3, and in this way their steering operation is carried out.

In the power steering apparatus according to this invention of the construction as described above, there will be given explanations about the orders to construct the torque sensor 6 on the pinion shaft 3 and to let the pinion shaft 3 be held in the interior portion of the pinion shaft housing 4.

The resisting element holding member 60 of the torque sensor 6 is pressured into the upper shaft 3a of the pinion shaft 3 to a prescribed position on the outer peripheral surface thereof in the longitudinal direction so that it may engage with a locking pin 60a provided on the outer peripheral surface thereof, then thus constructed upper shaft 3a of the pinion shaft 3 is inserted into the cylindrical pinion shaft housing 4 from the opening portion thereof together with said member 60 and held by means of said ball bearing 40 which is previously fitted internally and secured at a place near the upper end portion of said housing 4 with the upper end portion thereof projected by a proper length from upper opening portion of the pinion shaft housing 4.

On the other hand, one end portion of the torsion bar 5 is inserted in the lower shaft 3b at the axis position of the upper end portion thereof coaxially therewith and secured by a knock pin 5b. The four-point contact ball bearing 41 for holding the lower shaft 3a is externally fitted to the lower shaft 3b from the lower end portion and positioned in the longitudinal direction with respect to the lower shaft 3b with both sides of the inside thereof clasped by means of the downward annular surface of the stepped portion formed at a place near the upper end of said shaft 3b and the collar 42 which is externally fitted to the lower shaft 3b from the lower end portion thereof, bent and secured on the outer peripheral surface in the longitudinal direction. The upper shaft 3b to which the torsion bar 5 and the four-point contact ball bearings 41 are mounted in this way is positioned with respect to the pinion shaft housing 4 in the longitudinal direction with both ends of the outer side of the four-point contact ball bearings 41 clasped by means of the annular shoulder portion formed on the internal peripheral surface of the pinion shaft housing 4 and the lock nuts 43 threadedly provided on the internal peripheral surface of the pinion shaft housing 4 from the lower opening portion, after the detecting element holding member 61 of the torque sensor 6 is movably fitted on the outer peripheral surface of the upper end portion thereof to engage with the locking pin 61a then inserted in the pinion shaft housing 4 with the other end side of the torsion bar 5 being inside. In this state the torsion bar 5 is internally fitted in an aperture formed by substantially the whole length at its axis position of the uper shaft 3a, and the upper end portion of the torsion bar reaches near the upper end portion of the upper shaft 3a projected upward from the pinion shaft housing 4. Consequently, after the lower shaft 3b is positioned in the longitudinal direction as mentioned above, the sliding position of the detecting element and the resisting element of the torque sensor 6 is changed by rotating the shaft 3b to carry out the zero-point adjustment so that the sensor may output prescribed electric potential, then an aperture which is through in the radial direction in combination with the torsion bar 5 is formed near the upper end portion of the upper shaft 3a, and the upper shaft 3a and the lower shaft 3b are connected on the same axis by driving a knock pin 5b in this aperture.

The pinion shaft 3 held in the housing 4 in this way is supported not only by means of ball bearings 40 and four-point contact ball bearings 41 in the radial direction at two points spaced properly with respect to each other in the longitudinal direction, but also by the four-point contact ball bearings 41 both upward and downward in the longitudinal direction, so that the pinion shaft has sufficient bearing ability against the thrust load as well as the radial load applied on the shaft. In addition, since the four-point contact ball bearings 41 can support the pinion shaft 3 with the lengthwise displacement of the shaft kept sufficiently small even without pre-pressurizing, the pinion shaft 3 may be easily disposed in the pinion shaft housing 4 only by tightening the lock nuts 43 with a torque capable of bearing the thrust load expected to be applied on the pinion shaft 3 to the pinion shaft housing 4, and if necessary, by securing the nuts 43 by means of bending the nuts 43 toward the internal surface of the pinion shaft housing 4 thereafter. The displacement in the longitudinal direction in relation to the pinion shaft housing 4 of the torque sensor provided on the pinion shaft 3 disposed in this way is kept as little as possible, and misoperations of the torque sensor 6 due to this displacement can be prevented.

Moreover, as mentioned above, after the upper shaft 3a and lower shaft 3b are held in the pinion shaft housing 4, the pinion shaft 3 is incorporated into the pinion shaft housing 4 together with the torque sensor 6 provided on the outer peripheral surface, so that the pinon shaft 3 may be easily engaged with the rack shaft 1 only by inserting the pinion shaft housing 4 in the rack shaft housing 2 with the lower end portion of the lower shaft 3b projected at a lower portion of the housing 4 inside, and securing said housing 4 to said housing 2 at an upper place thereof.

Furthermore, by the use of bearings with seals in said four-point contact ball bearings 41, the alien substances in the rack shaft case 2 such as grease sealed in the place where the pinion teeth 30 and rack teeth 10 engage on another may be kept from intruding by means of the bearings 41 to prevent misoperation of the torque sensor 6 provided in the pinion shaft housing 4 due to such substances. In the same way, by the use of bearings with seals in the ball bearings 40, dusts are kept from intruding from outside into the pinion shaft housing 4 to prevent misoperations of the torque sensor 6 due to adhesion of these dusts to the sensor.

In this embodiment, a planetary roller reduction device 9 is mounted to the motor 8 for assisting steering coaxially therewith. It, however, is needless to say that a planetary gear reduction device mounted in the same way may be used instead.

Furthermore, in this embodiment, ball bearings 40 are used as radial bearings which holds the uper portion of the pinion shaft 3. It, however, is not necessarily limited to said type of bearings. Namely, cylindrical roller bearings, ball-and-roller bearings such as needle-shaped roller bearings or slide bearings may also be used as radical bearings.

Figure 3:
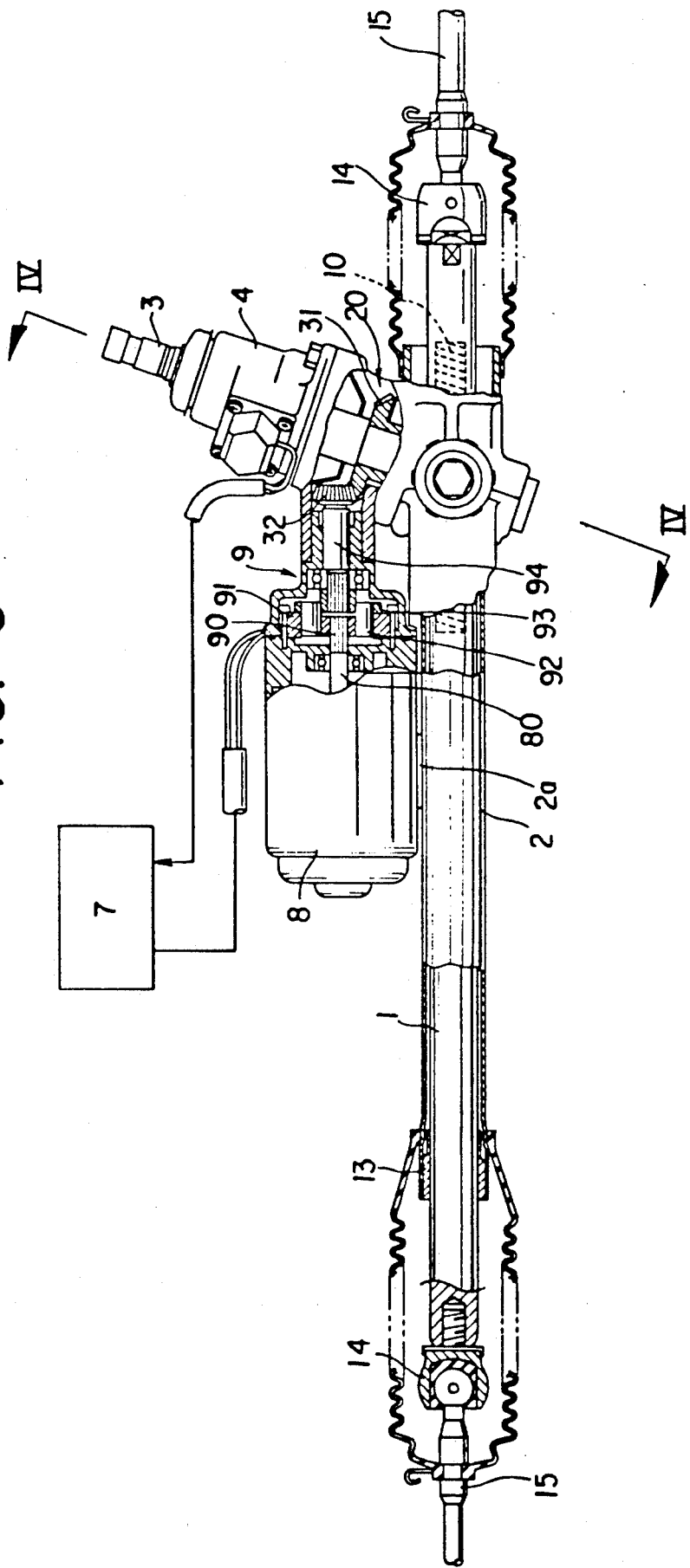
FIG. 3 is a partially broken front view of a power steering apparatus according to another embodiment of the invention.
Figure 4:
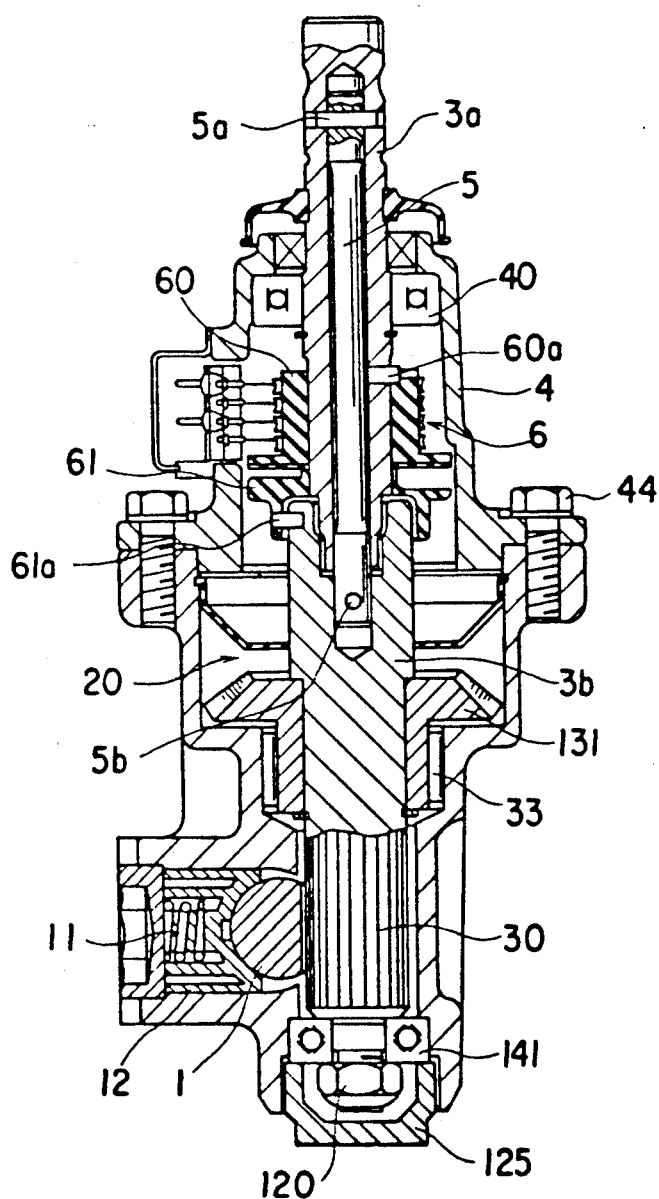
FIG. 4 is an enlarged sectional view thereof taken along line IV—IV of FIG. 3.

FIGS. 3 and 4 are views similar to FIGS. 1 and 2 showing another embodiment of the invention. The same reference numerals are used where applicable. In this embodiment, the motor 8 is mounted on a pad 118 above the rack shaft 2, i.e., at the steering wheel side, and the portion having the small bevel gear 132 is at the juncton of the pinion shaft housing 4 which terminates on the upper side of the rack shaft. The big bevel bear 131 on the pinion shaft 3 is also on the steering wheel side of the rack shaft.

As seen in FIG. 4, the big bevel gear 131 is mounted to the lower part 3b of the pinion shaft 3 above the pinion teeth 30 so that it is also on the steering wheel side of the rack shaft. The lower part of 3b of the pinion shaft at the collar at the lower end of the big bevel gear is held in place within the housing by a set of needle-shaped roller bearings 133, and the end of the part 3b by a set of the four-point contact ball bearings 141 so that the amount of bending of the lower shaft 3b at the place of engagement with the housing is kept within a prescribed permissible limit. A captive nut 120 covered by a press fit cap 125 is at the end of lower shaft part 3b which engages bearings 141 and holds them against an internal shoulder on the lower end of housing 4.

The embodiment of FIGS. 3 and 4 has advantages of over that of FIGS. 1 and 2 in that since the motor 8 and speed reduction means are located above and partly protected by the rack shaft 2, a cover for the motor 8 to protect it against jumping stones is made unnecessary. Also, since these components are now at a higher location, the level of water in the vehicle can move becomes higher without the danger of disabling the motor.

As has been described in detail, in the power steering apparatus according to this invention, the speed of the turning force of the motor may be reduced sufficiently by means of the planetary roller reductionn device or planetary gear reduction device mounted coaxially with the motor and a pair of bevel gears and transmitted to the rack shaft, so that sufficient assisting power can apply on the rack shaft even when the motor is replaced by small-sized one and the reduction device may be considerably miniaturized, whereby it is possible to compactly dispose the motor and the reduction device around the steering mechanism to enable easy installation of the apparatus in an engine room with small excess space.

The pinion shaft, being held by means of the four-point contact ball bearings and radial bearings in housing and constructed in one together with the torque sensor mounted to the pinion shaft and the housing, may be engaged with the rack shaft only by fixing the housing to a prescribed position on the rack shaft housing which will contain the rack shaft therein in a single pinion type power steering apparatus of the embodiments. The four-point contact bearings restrain the pinion shaft from moving in the longitudinal direction without being pressurized previously, so that the positioning of the pinion shaft in the housing can be carried out easily to save considerably time and labor required in assembling. Moreover, since the displacement of the input shaft lengthwise in the axial direction is kept substantially zero by means of the four-point contact ball bearings, there is no fear of the torque sensor misoperating due to this displacement. Furthermore, since the apparatus can be protected substantially completely against intrusion of an alien substance into the housing by the use of bearings with seals in the both bearings, there is no fear of the sensor misoperation due to adhesion of this alien substance to some portions of the torque sensor.

As this invention may be embodied in several forms without departing from the spirit of essential characteristics thereof, the present embodiments are thereof illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A power steering apparatus comprising,
   a pinion shaft having pinion teeth thereon which is interlockingly connected to a steering wheel;
   a rack shaft which engages with the pinion teeth on said pinion shaft and converts the rotation of said pinion shaft into a displacement in the longitudinal direction thereof;
   a torque sensor which is disposed at a place between said steering wheel and said pinion teeth and detects the steering torque applied on said steering wheel;
   a motor mounted below said rack shaft for assisting the steering operation, the rotary shaft of said motor being disposed substantially in parallel with said rack shaft to be driven on the basis of hte detected result of the steering torque detected by said torque sensor;
   a speed reduction means which is mounted to the rotary shaft of said motor coaxially therewith;
   a small bevel bear which is connected to the output shaft of said reduction means; and
   a big bevel gear which is connected to said pinion shaft at its end exteded opposite in relation to said steering wheel and engages with said small bevel gear.

2. A power steering apparatus as set forth in claim 1, wherein said torque sensor comprises,
   an input shaft and an output shaft connected each other by means of a torsion bar;
   a housing which contains said input shaft and output shaft;
   a four-point contact ball bearing which is fitted onto said output shaft in such a manner that the bearing is restrained from moving in the longitudinal direction of said output shaft, and is fitted and fixed in said housing to fix and hold the position of said output shaft in the longitudinal direction; and
   a radial bearing which is fitted into said housing in order to hold said input shaft.

3. A power steering apparatus as set forth in claim 1, wherein said reduction means includes planetary rollers.

4. A power steering apparatus as set forth in claim 1, wherein said reduction means includes planetary gears.

5. A power steering apparatus comprising,
   a pinion which is interlockingly connected to a steering wheel;
   a rack shaft which engages with said pinion and converts the rotation of said pinion into a displacement in the longitudinal direction thereof;
   a torque sensor which is disposed at a place between said steering wheel and said pinion and detects the steering torque applied on said steering wheel;
   a motor mounted to said rack shaft between said shaft and the steering wheel for assisting the steering operation, the rotary shaft of the motor being disposed substantially in parallel with said rack shaft to be driven on the basis of the detected result of the steering torque detected by said torque sensor;
   a speed reduction means which is mounted to the rotary shaft of said motor coaxially therewith;
   a small bevel which is connected lto the output shaft of said reduction means; and
   a big bevel gear which is connected to said pinion shaft at a place above said rack shaft to engage with said small bevel gear.

6. A power steering apparatus as set forth in claim 5, wherein said torque sensor comprises,
   an input shaft and an output shaft connected each other by means of a torsion bar;
   a housing which contains said input shaft and output shaft;
   a four-point contact ball bearing which is fitted onto said output shaft in such a manner that the bearing is restrained from moving the longitudinal direction of said output shaft, and is fitted and fixed in said housing to fix and hold the position of said output shaft in the longitudinal direction; and
   a radial beraing which is fitted into said housing in order to hold input shaft.

7. A power steering apparatus as set forth in claim 5, wherein said reduction means includes planetary rollers.

8. A power steering apparatus as set forth in claim 5, wherein said reduction means includes planetary gears.

* * * * *